Apr. 24, 1923.

B. R. WEBSTER 1,452,945

TYPESETTING MACHINE

Filed Dec. 27, 1921

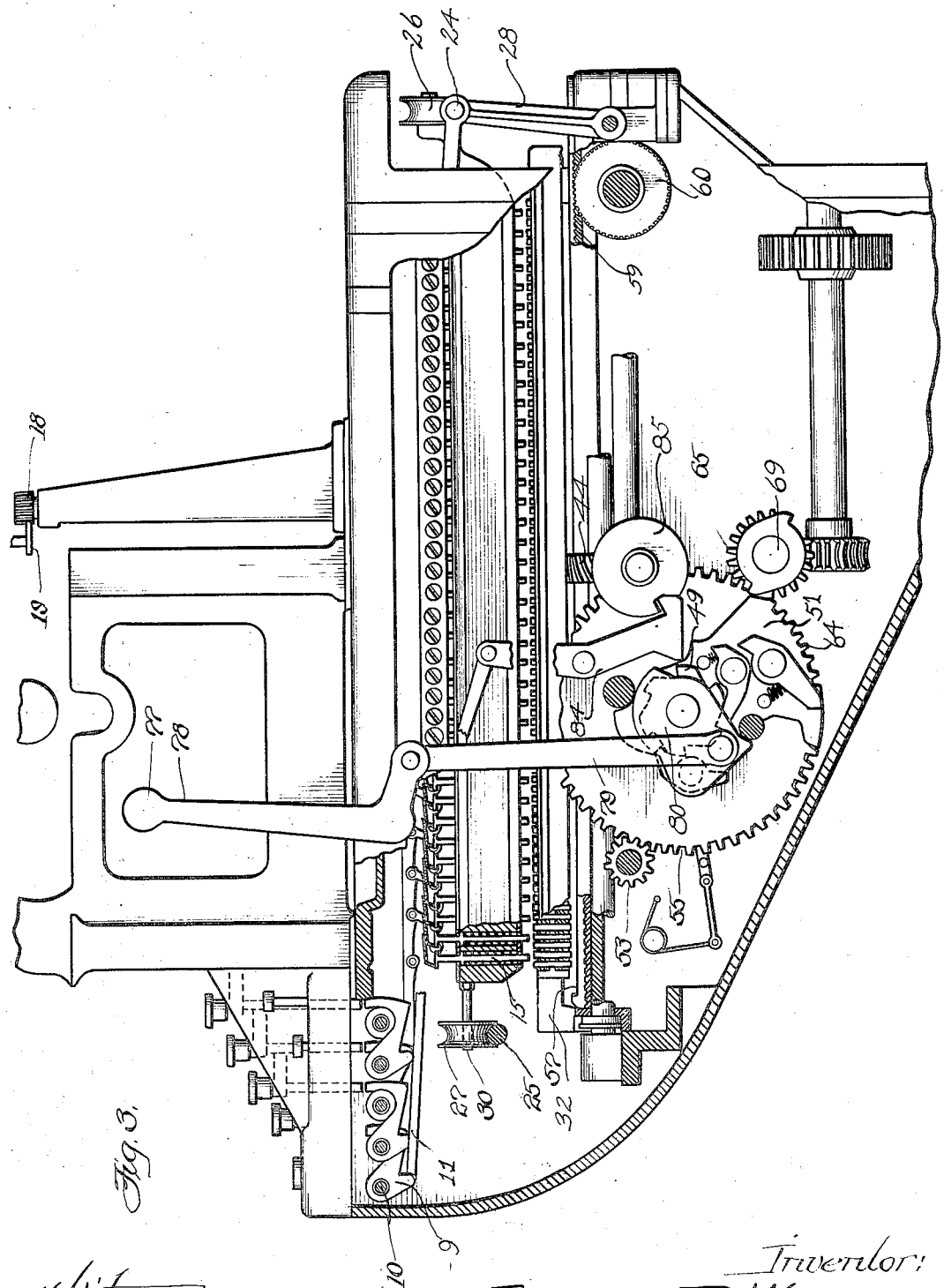

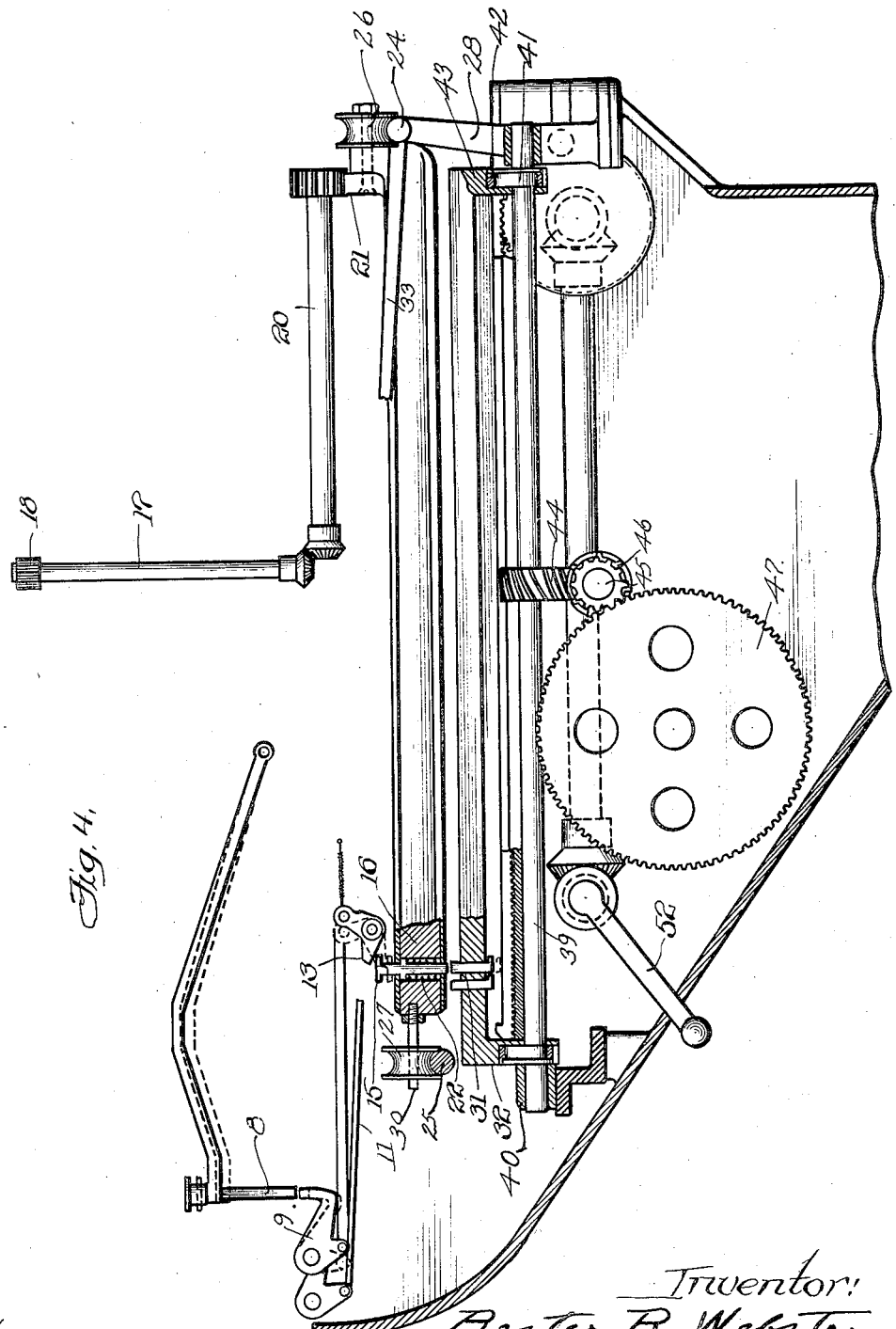

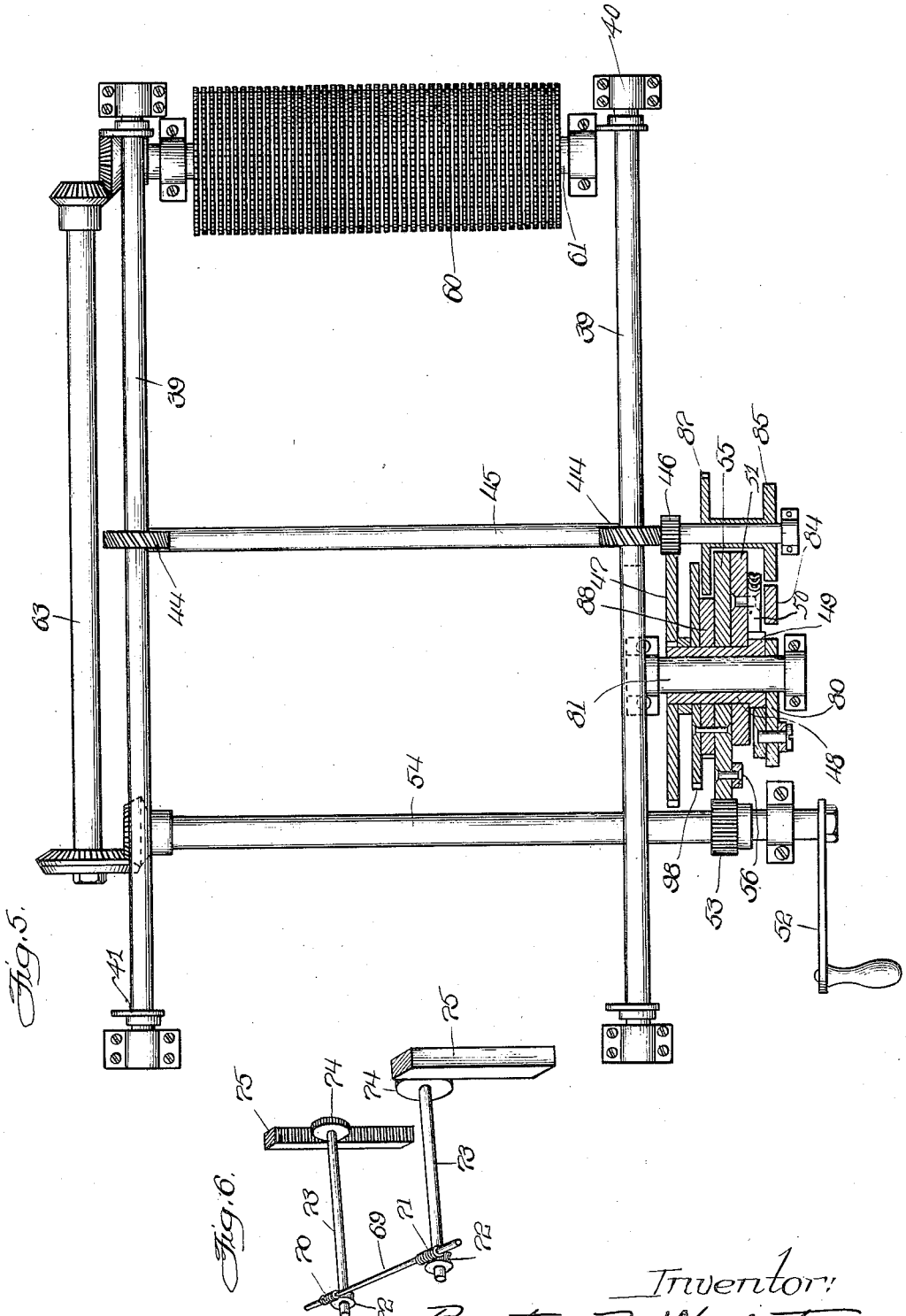

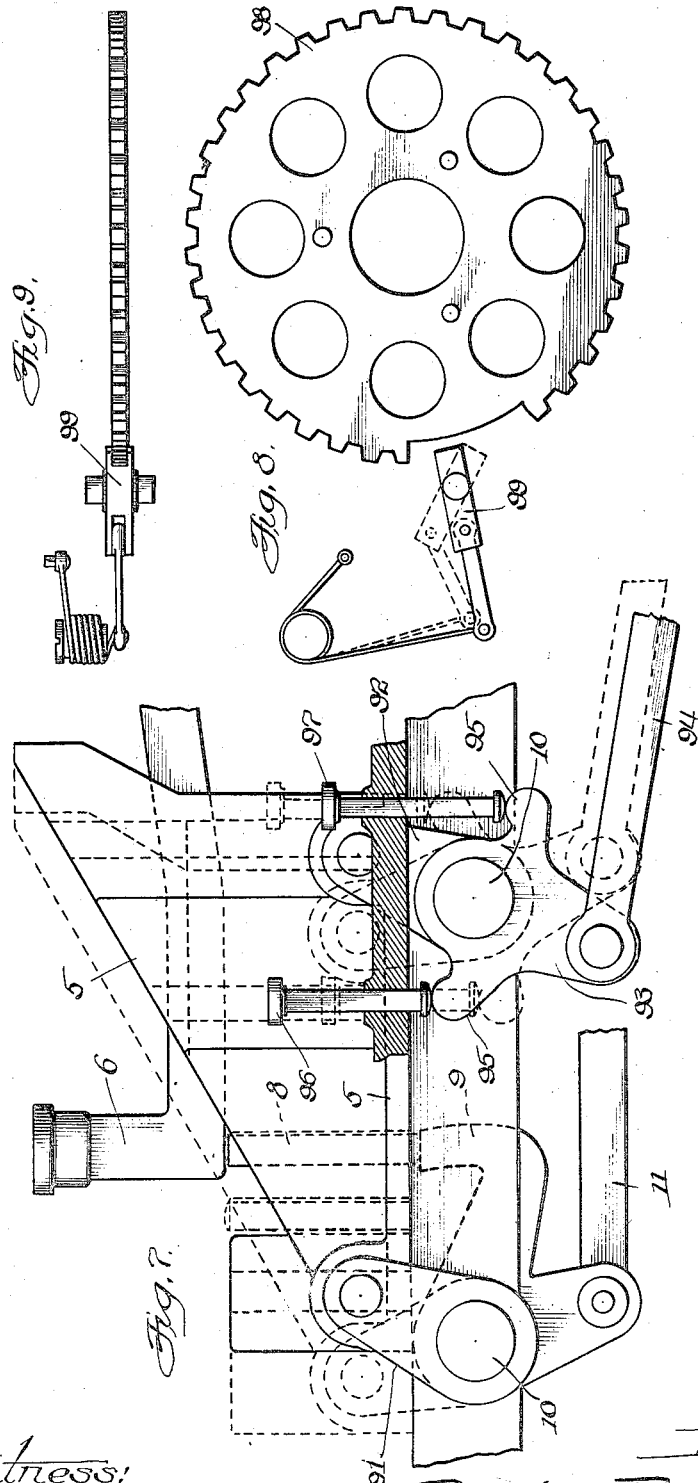

Apr. 24, 1923.
B. R. WEBSTER
1,452,945
TYPESETTING MACHINE
Filed Dec. 27, 1921
10 Sheets-Sheet 6
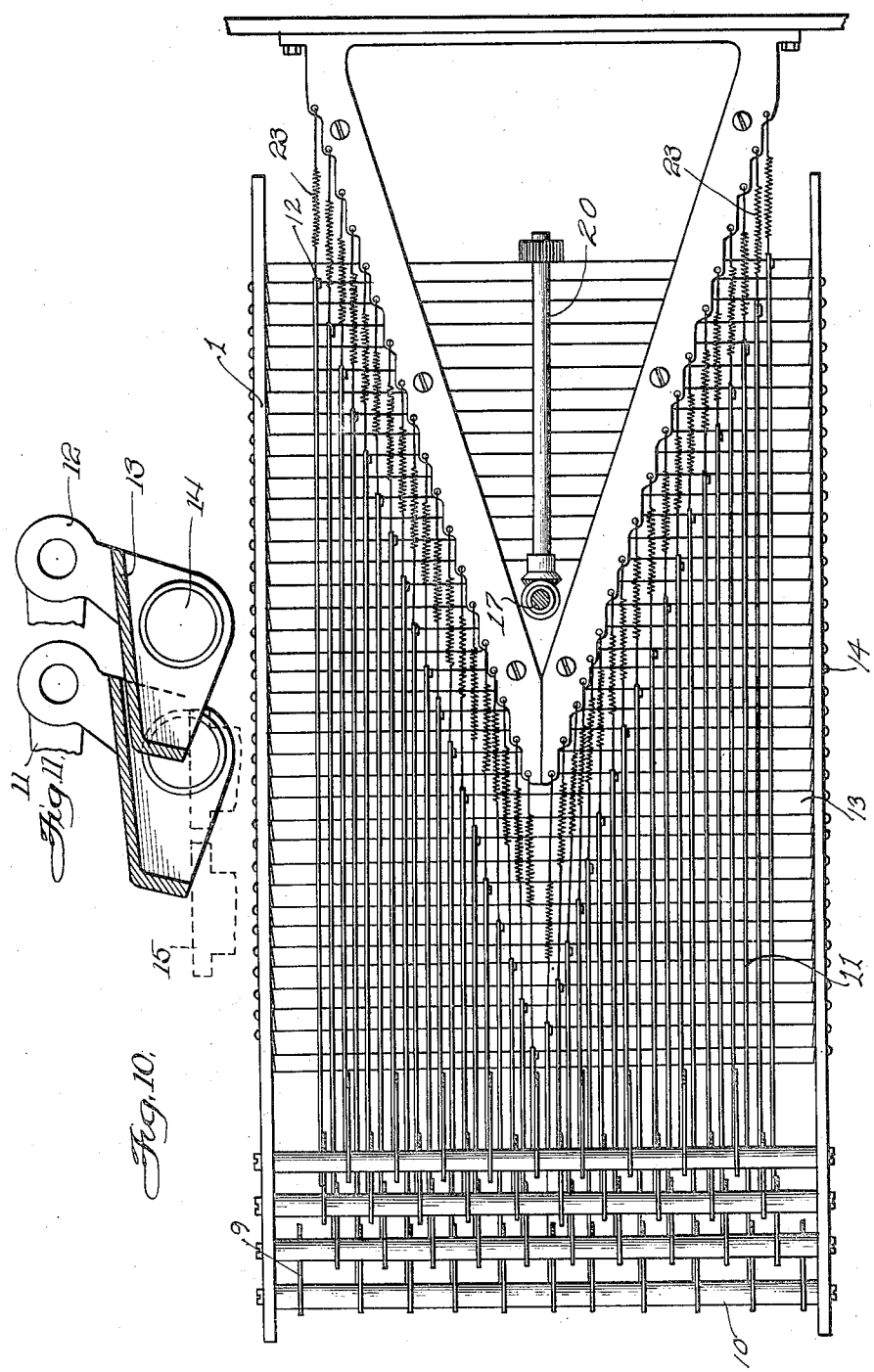

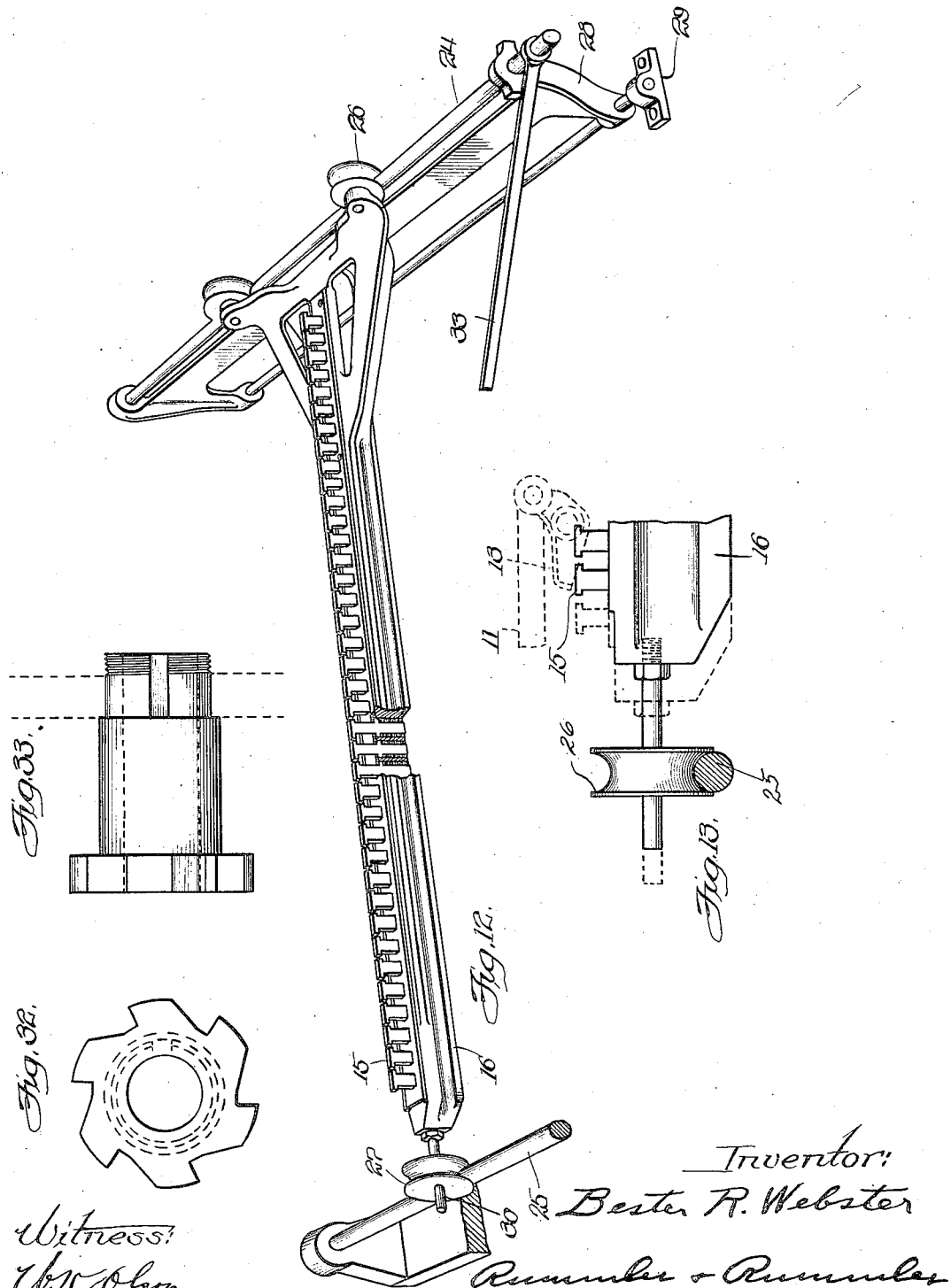

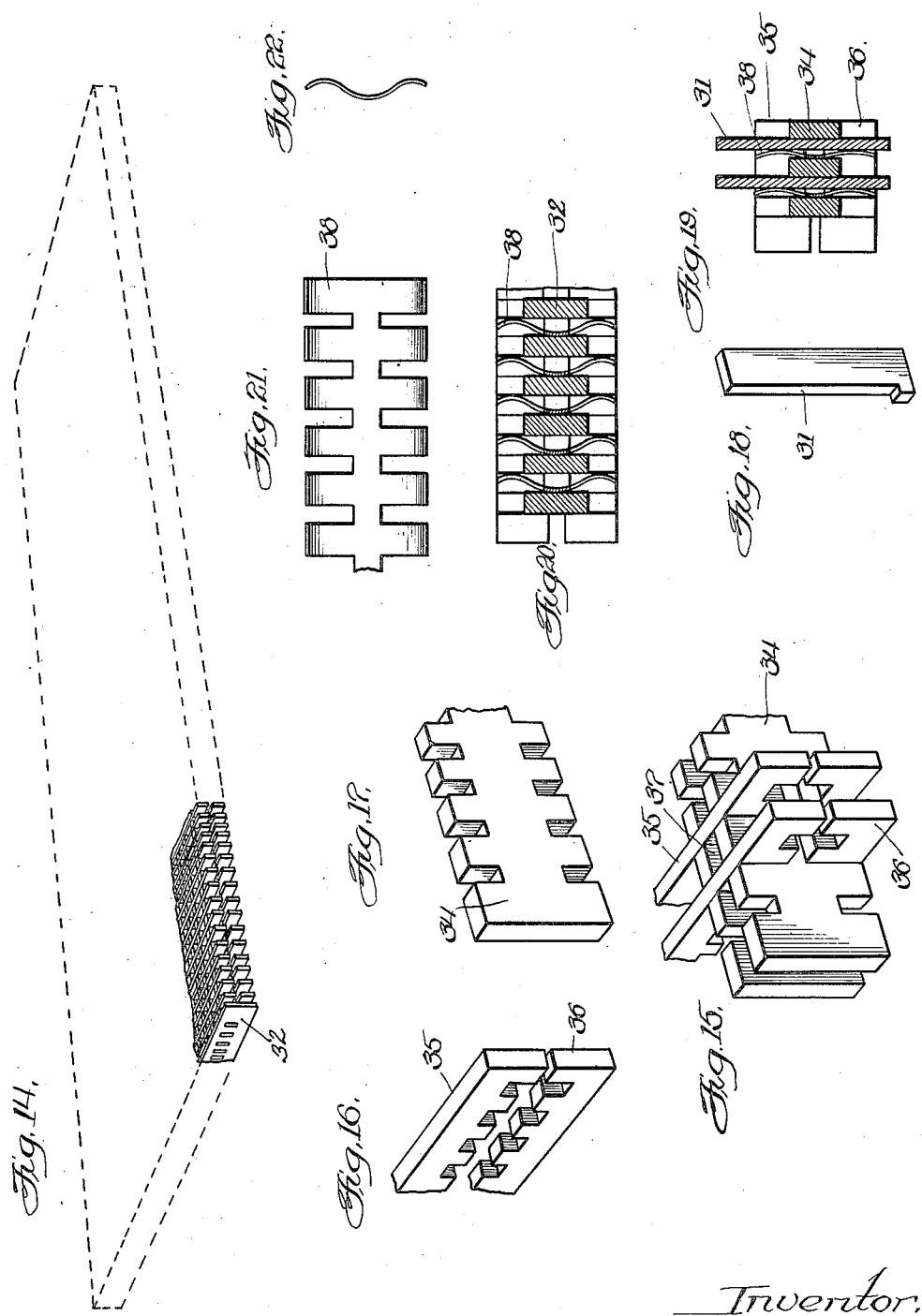

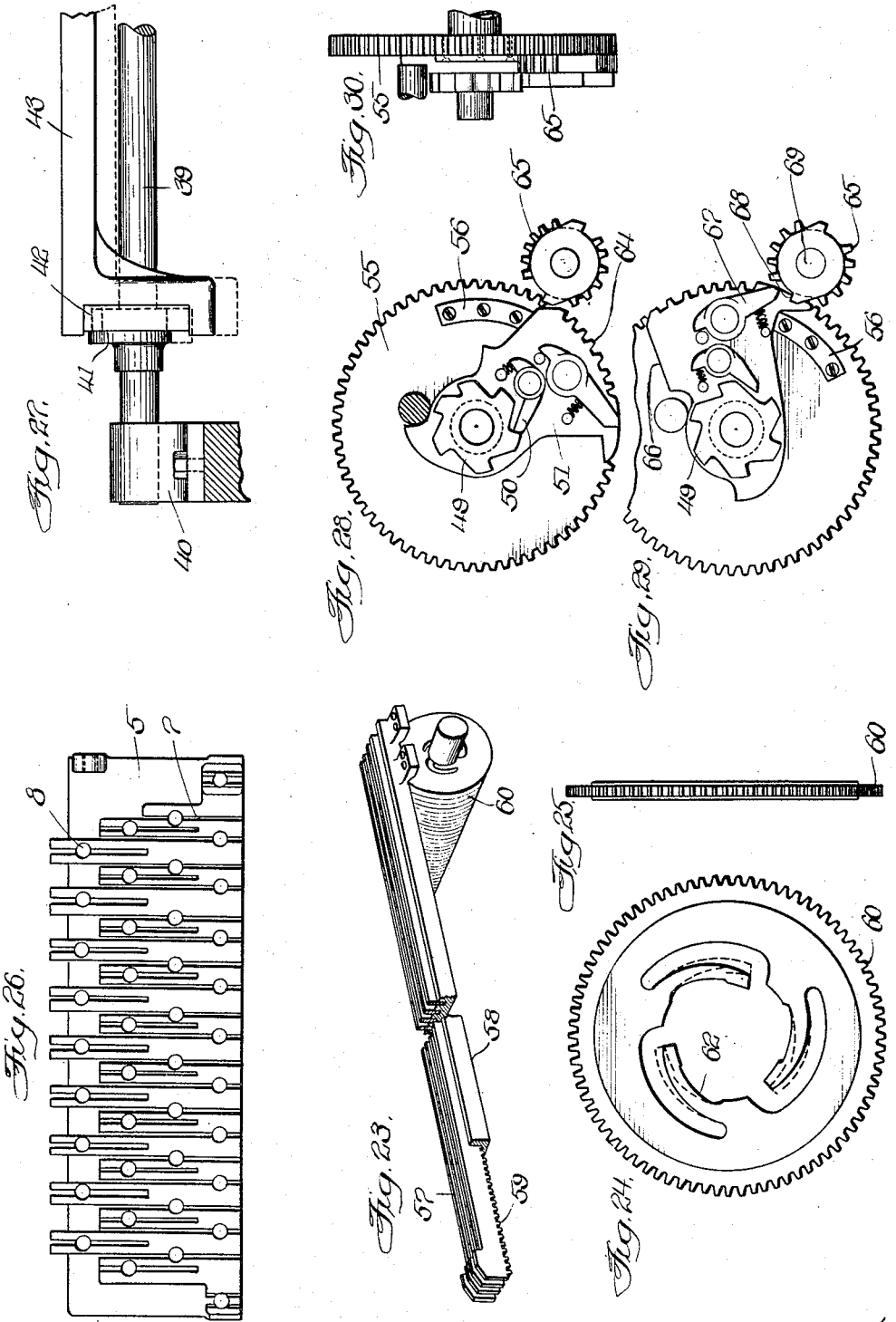

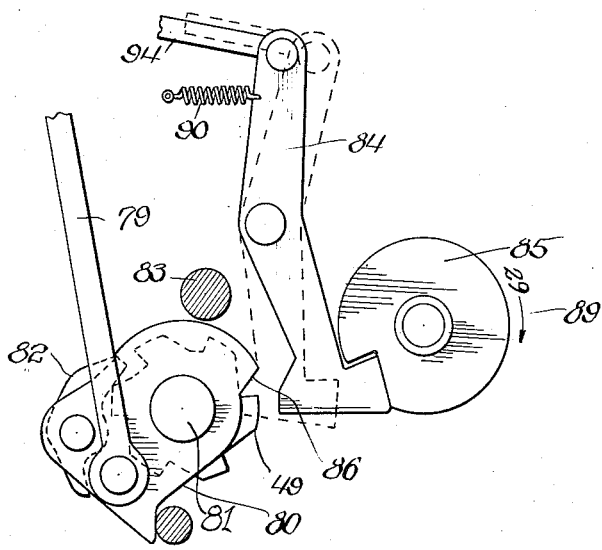

Patented Apr. 24, 1923.

1,452,945

UNITED STATES PATENT OFFICE.

BESTER R. WEBSTER, OF CHICAGO, ILLINOIS, ASSIGNOR TO CHESTER A. MACOMIC, OF CHICAGO, ILLINOIS.

TYPESETTING MACHINE.

Application filed December 27, 1921. Serial No. 525,172.

*To all whom it may concern:*

Be it known that I, BESTER R. WEBSTER, a citizen of the United States of America, and a resident of Chicago, county of Cook, and State of Illinois, have invented a new and useful Improvement in Typesetting Machines, of which the following is a specification.

This invention relates to typesetting machines particularly designed for use in connection with a typewriter of standard construction, the object being to provide an improved mechanism under the control of the typewriter keys for first setting type shifting mechanism in position for selecting the desired type and then operating this mechanism to shift a plurality of rows of type the desired distances in order to fill a type bar with type corresponding to the line written on the paper in the typewriting machine. This operation is repeated for each written line, provision being made for relative motion between the typewriter and the type magazine at the time that the platen of the typewriter is turned one line space.

Further purposes of the invention are to provide improvements in the general design and details of construction of a typesetting mechanism of the character disclosed in the patent to Chester A. Macomic, No. 1,301,146, April 22, 1919, including a typesettting mechanism adapted to receive a typewriter of standard construction which is employed for controlling the operation of the typesetting mechanism; to provide an improved stop section construction the stops of which are employed for regulating the extent of motion of shifting bars for rows of type; to provide a shiftable carriage of simplified construction operated in unison with the typewriter platen and serving, under the control of the typewriter keys to successively adjust stops in the different rows of the stop section corresponding with the position of the platen; to provide an improved friction gear drive for type selecting bars.

These objects are accomplished by the mechanism illustrated in the accompanying drawings, in which, Figure 1 is a plan view showing the general arrangement of the entire machine.

Figure 3 shows the typewriter in side elevation and partly broken away, and a longitudinal sectional view of the type selecting mechanism which has direct coaction with the typewriter.

Figure 4 is a longitudinal sectional detail illustrating the stop setting carriage and its connection with the keys of the typewriter, its gear connection with the platen carriage of the typewriter and a crank handle drive for the type selecting bars.

Figure 5 is a detail in plan showing the friction gears for driving type selecting bars and the means for rotating these gears.

Figure 6 is a perspective detail of gearing employed for producing a vertical step by step motion of the typesetting mechanism with respect to the type magazine.

Figure 7 is a detail in side elevation and partly in section illustrating the mechanism by which motion is transmitted from the typewriter keys to the stop adjusting carriage and a means for disconnecting the typewriter from the type setting mechanism so that the typewriter may be used in the ordinary way independently of this typesetting mechanism.

Figure 8 illustrates, in side elevation, a full stroke mechanism for the main driving crank of the type selecting mechanism.

Figure 9 is a plan view of the full stroke device illustrated in Figure 8.

Figure 10 is a detail in plan of the universal bars for controlling the adjustment of stops in the stop section indirectly through a laterally shiftable carriage, and includes link connections between these universal bars and bell cranks operated by the typewriter keys.

Figure 11 is a sectional detail of two of the universal bars.

Figure 12 is a perspective view of the laterally shiftable stop adjusting carriage.

Figure 13 is a fragmentary detail in side elevation illustrating how this carriage coacts with the universal bars under the control of the typewriter keys and also illustrates how this carriage may be shifted longitudinally in order to select small or capital letters in the type magazine.

Figure 14 is a perspective view of the stop plate illustrating only a portion of this section in full lines.

Figure 15 is an enlarged perspective detail of the stop section but with the stops omitted.

Figures 16 and 17 are perspective details of comb-shaped elements which constitute the frame of the stop section.

Figure 18 is a detail in perspective of one of the stops of the stop section.

Figure 19 is a fragmentary detail in vertical section of the stop plate and stops therein.

Figure 20 is a horizontal sectional detail of the stop plate.

Figure 21 is a fragmentary detail in side elevation of a spring bar for frictionally retaining the stops of the stop plate in adjusted position.

Figure 22 is an end view of the spring bar shown in Figure 21.

Figure 23 is a perspective detail illustrating the type adjusting bars or racks and the friction gear drive therefor.

Figure 24 shows one of the friction gears in side elevation, and Figure 25 is an end view of the same gear.

Figure 26 is a plan view of the guide plate for the typewriter keys.

Figure 27 is a sectional detail in side elevation of mechanism for restoring the stops in the stop plate after the type has been selected.

Figures 28 and 29 are details showing mechanism in different positions which is connected with the main drive crank and is employed for producing the motion of the stop carriage necessary for restoring the stops and for shifting the entire typesetting mechanism.

Figure 30 is an end view of the construction shown in Figure 28.

Figure 31 is a fragmentary detail in side elevation illustrating the part of the stop restoring mechanism which is employed only to restore the stops when an error has been made by depressing the wrong key and also illustrates an interlocking device which serves to render the typewriter ineffective with respect to the typesetting mechanism when the latter is operating to select type.

Figures 32 and 33 are details of a ratchet shown in Figure 31.

Figure 1:
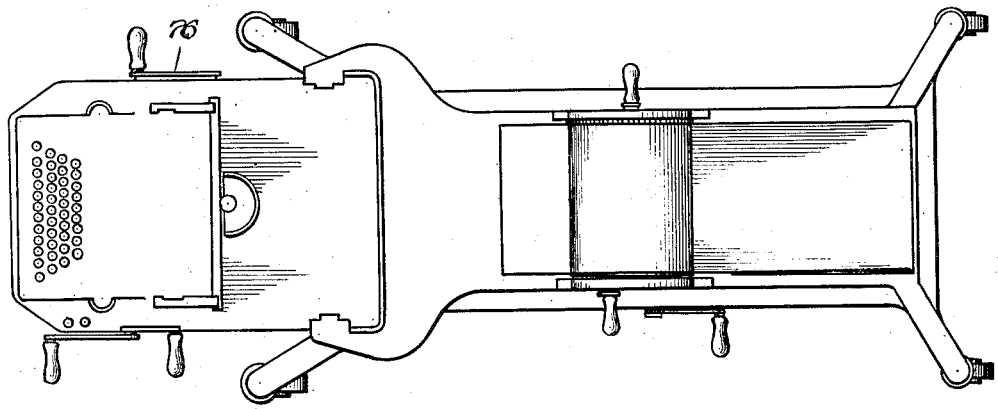
Figure 2:
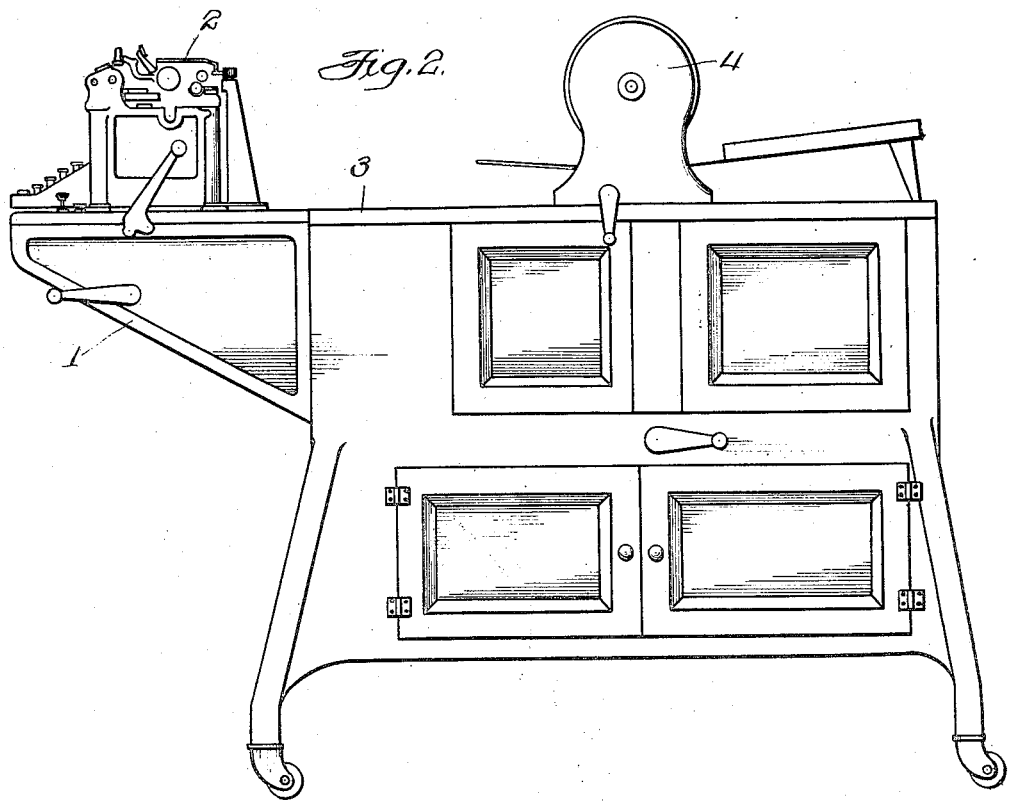
Figure 2 is a view in side elevation of the entire machine.

There are five principal units of mechanism included in this machine, namely the typewriter, type-selecting mechanism, type magazine, and printing mechanism. The drawings do not illustrate the typewriter, which is of standard construction, the printing mechanism and the type magazine. The type magazine may be of the character disclosed in the afore-mentioned Macomic patent.

The present invention relates particularly to a means for selecting and adjusting the type in the type magazine. The principal units of the type selecting mechanism are frictionally driven racks or type adjusting bars, a stop plate for controlling the extent of movement of the type-selecting bars, a laterally shiftable carriage which serves to successively adjust the stops in the stop plate for controlling the motion of the different type-selecting bars, and a connection between the laterally movable carriage and the keys of the typewriter.

*Mechanism for adjusting stops in the stop plate.*

The frame 1 which supports the typewriter 2 and the type-selecting mechanism, is adjustable vertically with respect to the frame 3 which is in the form of a cabinet containing the type magazine, not illustrated, and supporting a printing mechanism 4. The frame 1 is provided with a horizontally disposed plate 5 [Figs. 7 and 26] which is slotted to serve as a guide for the typewriter keys 6. Slidably mounted in each of the slots 7 of plate 5 is a plunger 8 in position to be engaged by the forward lower edge of the typewriter key. When one of the typewriter keys is depressed, its corresponding plunger 8 is forced downwardly into engagement with one of the bell crank levers 9. There is one bell crank lever 9 for each plunger 8 and the corresponding typewriter key. These bell cranks are pivotally supported on a series of transverse shafts 10 mounted in a horizontal plane at the upper end of the frame 1. Each bell crank lever has a link connection 11 with upwardly extending ears 12 of transversely extending universal bars 13. These bars are pivotally mounted on frame 1 by headed pins 14. Accordingly when a typewriter key is depressed a universal bar 13 is rocked downwardly at its forward edge causing the bar to depress its corresponding pin 15 [Fig. 4] in a carriage 16. When the typewriter key is released the escapement mechanism of the typewriter through the platen carriage serves to rotate shaft 17 slightly through a pinion 18 [Figs. 3 and 4] which meshes with a rack 19 fast to the platen carriage. The rotation of shaft 17 is communicated through a shaft 20 to the laterally shiftable carriage 16. This carriage as shown in Figures 4 and 12 is equipped with a rack 21 meshing with a pinion on the shaft 20. During the release of the typewriter key and just before the carriage 16 shifts laterally one step the depressed pin 15 in the carriage is restored to its upper position by spring 22. The links 11, and each universal bar 13 and bell crank 9 connected therewith, are restored to initial position by the springs 23 [Fig. 10].

The carriage 16 in its lateral motion is guided along the rails 24 and 25 upon which it is supported by rollers 26 and 27. The rail 24 is supported on a swinging yoke 28 pivoted in the bearing 29. The pin 30 is fixed on the forward end of the frame 16 and slides through the roller 27 when the yoke 28 is rocked on its fulcrum. The purpose of rocking the yoke 28 and thereby shifting the carriage 16 forwardly or rearwardly a slight distance is to place its pins 15 opposite different sets of stops 31 in the stop plate 32. These different sets of stops are employed for determining the selection of either capital or small letters in the type magazine. The shift keys of the typewriter are for this reason arranged to draw the link 33 [Fig. 12] forwardly when depressed. The link 33 at its forward end is connected to a bell crank similar to 9 shown in Figure 7 but which is located below a shift key of the typewriter.

Stop plate.

The function of the stop plate is to determine the extent of motion which is imparted to the type adjusting bars, illustrated in Figure 23, after a line is written by the typewriting machine. This plate is constructed as illustrated in Figures 14 to 19, inclusive, and consists in a plurality of longitudinally extending comb members 34, shown in Figure 17, and interfitting laterally extending upper and lower comb members 35 and 36, all of the comb members when assembled as shown in Figure 15 providing vertically extending rectangular slots 37 for receiving these stops 31. On one face of each comb member 34 is a correspondingly shaped spring comb 38 formed as shown in Figures 21 and 22 and serving to retain the stops 31 in adjusted position in the stop plate. The stop section is supported on the shafts 39 extending longitudinally of the machine, and one at each side. These shafts have bearings 40 fixed to the frame structure but carry eccentrics 41 fitting within shoes 42 inserted in the recesses of the frame casting 43 which supports the stop plate. The object of so mounting the stop plate is to provide for moving the plate down for the purpose of restoring all set stops to their original position. This is accomplished by rotating the shafts 39 through the spiral gears 44 which connect these shafts with a laterally extending shaft 45 which in turn is driven by gearing shown in Figure 5. The gearing 46 and 47, sleeve 48, ratchet 49, dog 50 on segment gear 51 (Fig. 28) serve to transmit motion to the shaft 45. The segment gear 51 is oscillated upon rotation of crank 52 through the pinion 53 on crank shaft 54.

Pinion 53 meshes with a gear 55 loosely journaled on the sleeve 48 and carrying a lug 56 for engaging and driving the segment gear 51. This engagement does not occur until the final reverse turn of crank 52 after it has been rotated forwardly five revolutions and then reversed to its original position. The crank is rotated forwardly and reversely in this manner mainly for the purpose of driving the type-selecting bars forwardly to select type and then restore these bars to their initial position. Figure 28 shows the gear 55 in its normal position while Figure 29 shows the gear as it would appear after the end of the five forward rotations of the crank handle 52. Upon the downward movement of the stop plate the adjusted stops 31 therein are restored to their original position and retained in such position by the springs 38. At the time that the stop plate moves downwardly the stops which have been adjusted by the operation of the typewriter keys engage the upper edges of the type-selecting bars 57.

Type-selecting mechanism.

The stops 31 of the stop plate serve to limit the motion of the type-selecting bars 57 when these are shifted rearwardly in the type-selecting operation. The bars 57 are guided in slotted plates 58 and have rack teeth 59 on their lower edges for meshing with friction gears 60. These gears as shown in Figure 5, are mounted upon a transverse shaft 61 and frictionally engage the shaft 61 by being formed with a plurality of resilient tongues 62 as illustrated in Figure 24. The driving connection for shaft 61 is direct to the crank shaft 54 as illustrated in Figure 5 through the intermediate longitudinally extending shaft 63. By rotating crank 52 several times in one direction and then reversely, all of the bars are shifted rearwardly different distances as controlled by the stops and stop plate and by this movement do the type selecting and then are restored to the home position as illustrated by the drawings, the final turn of crank 52 serving as previously described to restore the stops in the stop plate by lowering the plate so that the downwardly projecting stops will engage the bars 57 and thereby be forced upwardly into alignment with all other stops in the stop plate.

Relative shift between the type-selecting mechanism and the type magazine.

The type magazine which is not illustrated in the drawings but corresponding with that disclosed in the Macomic patent before referred to consists of a stack of horizontally disposed type supporting plates. The type-selecting mechanism operates upon the upper-most plate to set a line of type and then is moved downwardly the distance between the two type plates in order to come into line with the next lower type plate. This lowering of the type-selecting mechanism including the typewriting machine and all directly connected parts is accomplished upon the last return revolution of crank 52. For this purpose the segment gear 51 (Fig. 28) is provided with teeth 64 for engagement with the mutilated pinion 65. This engagement occurs when the segment gear moves from the position illustrated in Figure 29 to its original position as illustrated in Figure 28 and is due to the lug 56 engaging the upper edge 66 of the segment gear. The segment gear carries a dog 67 for engagement with a tooth 68 on a disc rigid with the mutilating gear 65 in order to bring this gear into meshing relation with the segment gear. The mutilated pinion 65 is fast to a shaft 69 which, as illustrated in Figure 6, carries right and left worms 70 and 71 coacting with worm wheels 72 on longitudinal shafts 73. The shafts 73 carry pinions 74 meshing with vertically disposed racks 75 rigid with the frame 3 which serves to guide the type selecting mechanism and typewriter supported thereon during its vertical motion.

For the purpose of lifting the type-selecting unit to return it to its original position ready for setting a new form of type, shaft 69 may be reversely rotated by means of a crank 76 (Fig. 1) fast to this shaft. This reverse motion of the shaft 69 does not disturb the segment gear 51 and mechanism operated thereby because the mutilated pinion is normally out of mesh with the segment gear.

Error correcting mechanism.

In case of error in depressing the wrong key, this is made apparent by the matter printed by the typewriting machine and in order to correct the error before the type is set, a means is provided for independently lowering the stop plate to return the adjusted stops 31 to initial position. This is accomplished by drawing forwardly on handle 77 of bell crank levers 78 (Fig. 3). This lever is connected by means of a link 79 (Fig. 31) to an arm 80 journaled on a stub shaft 81 which passes through and supports the sleeve 48 and gears thereon, shown in Figure 5. The arm 80 carries a pawl 82 for coacting with the ratchet wheel 49. This ratchet wheel, as previously described, is fast to the sleeve 48 carrying the gear 47 which drives stop plate lowering mechanism. When the pawl 82 has driven the ratchet wheel 49 the desired distance, it engages the fixed stop 83 on the main frame 1 which serves to prevent overthrow of ratchet 49.

Interlock.

For safety, the interlocking lever 84 shown in Figure 31 serves to prevent the restoring motion of the stop plate whenever the type adjusting racks have been moved rearwardly out of their normal position. This interlocking lever 84 coacts with a notched disc 85 and a cam 86 on the arm 80. The interlocking arm 84 is shifted to the dotted line position shown in Figure 31 where it prevents motion of the arm 80 whenever the cam disc 85 is rotated away from its normal position. This disc has a gear connection 87 with a gear 88 fast to the gear 55 which is rotated by means of the crank 52. This gear connection is such that upon the five forward revolutions of the crank 52 the disc 85 will not make quite a complete revolution in the direction indicated by arrow 89 and therefore serves to hold the interlocking pawl 84 in locking relation with arm 80 until the crank 52 is reversely rotated to its original position. The interlocking lever 84 is held in its normal position as shown in Figure 31 by the spring 90.

Means for disconnecting the typewriting machine from the type-selecting mechanism.

The typewriting machine may be lifted free from the typesetting mechanism so as to be usable independently of this mechanism and may likewise, without removal, be used independently of the type-selecting mechanism merely by shifting the typewriter key guide 5, shown in Figure 26, and 7 forwardly so as to move the plungers 8 carried thereby out of coaction with the typewriter keys. The guide plate 5 is supported by arms 91 and 92 supported on the shafts 10.

Movable with the arm 92 is a rocker arm 93 having a link connection 94 with the interlocking lever 84 (Fig. 31). Rocker arm 93 has a pair of ears 95 in position to be engaged by depressible keys 96 and 97. When key 96 is depressed, the slotted guide plate 5 is shifted forwardly. Whenever the interlocking lever 84 is operated due to an operation of the type-selecting racks, the link connection 94 between the lever 84 and the arm 93 (Fig. 7) serves to rock this arm and thereby disconnect the typewriting machine from the type-selecting mechanism the same as would be affected by a downward depression of the key 96. By so disconnecting the typewriting mechanism from the remainder of the machine when the racks are out of normal position no misoperation would result through a mere idle operation of the typewriter keys.

Figures 8 and 9 illustrate another safety device which is employed to insure that the required number of rotations forwardly and reversely are imparted to the crank 52 in the type-selecting operation. This full stroke mechanism comprises a ratchet plate 98 fast to gear 55 (Fig. 5) and coacting with the double acting pawl 99 shown in Figures 8 and 9.

The operation.

In the operation of setting type, the typewriting machine is operated in a customary manner except that at the completion of the writing of each line on the platen a type-selecting mechanism is operated by rotating the crank 52 before the next line is written. The five forward turns of the crank serve to rotate the friction gears 60 sufficiently to insure that all of the type-selecting bars 57 are moved rearwardly into position for engaging the stops which have been lowered into their path by the depression of the typewriter keys. These type bars are equipped with noses at their forward ends as clearly illustrated in Figure 23 for coaction with the stops in the stop plate. The rearward motion of the bars 57 serves to select the desired type but they are returned idly by the reverse rotation of the crank 52.

The adjustment of stops for regulating the motion of the bars 57 is effected by the laterally traveling pin carriage 16 shown in Figure 12. This carriage travels from side to side over the machine during the writing of the line by the typewriter. One of its pins 15 is depressed each time a typewriter key is operated and pushes one of the stops 31 in the stop plate downwardly into position to coact with the nose of the corresponding type-selecting bar 57. Carriage 16 moves in unison with the typewriter platen and therefore between operation of the keys successively comes to rest over the different longitudinal rows of stops in the stop plate.

I claim:

1. In a typesetting machine of the class described, the combination with a typewriting machine, of type-selecting mechanism, said type-selecting mechanism comprising a plurality of differentially adjustable selecting bars, a guiding member for the keys of the typewriting machine, said guiding member being equipped with plungers for coacting with the keys of the typewriting machine and the type-selecting mechanism, and means for shifting said guiding member and plungers into and out of cooperation with the typewriter keys.

2. In a typesetting machine of the class described, the combination with a typewriting machine, of type-selecting mechanism, said type-selecting mechanism comprising a plurality of differentially adjustable selecting bars, plungers for coacting with the keys of the typewriting machine and the type-selecting mechanism, and means for shifting said plungers into and out of cooperation with the typewriter keys.

3. In a typesetting mechanism, the combination with differentially adjustable typesetting elements, means for controlling the motion of said typesetting elements said means including a plunger supporting plate comprising a plurality of longitudinal and lateral interfitting comb shaped strips.

4. A device of the class described, comprising differentially adjustable elements, plungers for controlling the motion of said elements, a plunger supporting plate comprising a plurality of longitudinal and lateral interfitting comb shaped strips.

5. A device of the class described, comprising differentially adjustable elements, plungers for controlling the motion of said elements, a plunger supporting plate comprising a plurality of longitudinal and lateral interfitting comb shaped strips, and means for resiliently retaining the plungers in adjusted position in said plates.

6. A device of the class described, comprising differentially adjustable elements, plungers for controlling the motion of said elements, a plunger supporting plate comprising a plurality of longitudinal and lateral interfitting comb shaped strips and comb shaped leaf-springs for resiliently retaining the plungers in adjusted position in said plates.

7. A device of the class described comprising differentially adjustable type-setting elements, manipulative means for controlling the motion of said elements, intermediate controlling mechanism between said typesetting elements and the manipulative means, said intermediate controlling mechanism comprising a plurality of rocker bars adjustable under the action of said manipulative means, and a travelling plunger carriage cooperating with said rocker bars and movable step by step under the control of said manipulative means.

8. A device of the class described comprising differentially adjustable type-setting elements, manipulative devices for controlling the motion of said elements, and frictionally driven gears for driving said elements.

9. A device of the class described comprising differentially adjustable type-setting elements, manipulative devices for controlling the motion of said elements, frictionally driven gears for driving said elements, and a rotatable shaft for supporting said gears, said gears being provided with internal projections resiliently engaging said shaft.

Signed at Chicago this fourth day of October, 1921.

BESTER R. WEBSTER.